(12) United States Patent
Suzuki et al.

(10) Patent No.: US 11,593,928 B2
(45) Date of Patent: Feb. 28, 2023

(54) MANUFACTURING HISTORY MANAGEMENT SYSTEM AND MANUFACTURING HISTORY MANAGEMENT METHOD

(71) Applicant: TOYOTA JIDOSHA KABUSHIKI KAISHA, Toyota (JP)

(72) Inventors: Kojiro Suzuki, Hamamatsu (JP); Yuichi Furukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 17/081,148

(22) Filed: Oct. 27, 2020

(65) Prior Publication Data
US 2021/0142468 A1 May 13, 2021

(30) Foreign Application Priority Data

Nov. 8, 2019 (JP) .............................. JP2019-202925

(51) Int. Cl.
*G06T 7/00* (2017.01)
*G05B 19/418* (2006.01)

(52) U.S. Cl.
CPC ........ *G06T 7/0004* (2013.01); *G05B 19/4183* (2013.01); *G05B 19/4184* (2013.01); *G05B 19/41865* (2013.01); *G06T 2207/10081* (2013.01)

(58) Field of Classification Search
CPC ............ G05B 19/4183; G05B 19/4184; G05B 19/41865; G06T 2207/10081
See application file for complete search history.

(56) References Cited

U.S. PATENT DOCUMENTS

2019/0227001 A1* 7/2019 Cho ....................... G06T 7/001
2019/0244291 A1 8/2019 Godell et al.

FOREIGN PATENT DOCUMENTS

| JP | 2019-164524 A | 9/2019 | |
| WO | 2018/117120 A1 | 6/2018 | |
| WO | WO-2018117120 A1 * | 6/2018 | ............. B21C 51/00 |

* cited by examiner

*Primary Examiner* — Manuel A Rivera Vargas
(74) *Attorney, Agent, or Firm* — Sughrue Mion, PLLC

(57) ABSTRACT

A manufacturing history management system according to an aspect of the present disclosure includes a data generation unit, a data storage unit, and a data extraction unit. The data generation unit generates manufacturing history data by associating internal void information specific to a product and manufacturing history information of the product with a product identification code. The data storage unit stores the manufacturing history data relating to a plurality of the products generated by the data generation unit. The data extraction unit checks the internal void information of the manufacturing history data of the plurality of products stored in the data storage unit against the internal void information of a predetermined product and extracts the manufacturing history data that matches the internal void information of the predetermined product from the manufacturing history data of the plurality of products stored in the data storage unit.

7 Claims, 4 Drawing Sheets

Fig. 3

| PRODUCT | INTERNAL VOID INFORMATION | PRODUCT IDENTIFICATION CODE | PRODUCT HISTORY INFORMATION |
|---|---|---|---|
| PRODUCT A |  | 0001 | MANUFACTURING CONDITION A1, MANUFACTURING CONDITION A2,... |
| PRODUCT B | 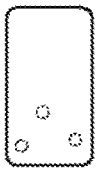 | 0002 | MANUFACTURING CONDITION B1, MANUFACTURING CONDITION B2,... |
| PRODUCT C | 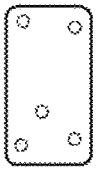 | 0003 | MANUFACTURING CONDITION C1, MANUFACTURING CONDITION C2,... |
| PRODUCT D | 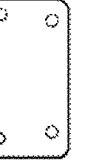 | 0004 | MANUFACTURING CONDITION D1, MANUFACTURING CONDITION D2,... |
| PRODUCT E | 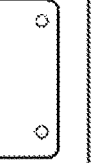 | 0005 | MANUFACTURING CONDITION E1, MANUFACTURING CONDITION E2,... |
| ... | ... | ... | ... |

MANUFACTURING HISTORY MANAGEMENT SYSTEM AND MANUFACTURING HISTORY MANAGEMENT METHOD

CROSS REFERENCE TO RELATED APPLICATIONS

This application is based upon and claims the benefit of priority from Japanese patent application No. 2019-202925, filed on Nov. 8, 2019, the disclosure of which is incorporated herein in its entirety by reference.

BACKGROUND

The present disclosure relates to a manufacturing history management system and a manufacturing history management method.

Recently, for the purpose of product quality control and the like, a manufacturing history management system for managing the manufacturing history of a product has been developed. International Patent Publication No. WO 2018/117120 discloses a technique for ensuring consistent traceability in a manufacturing step of steel products.

The technique disclosed in International Patent Publication No. WO2018/117120 ensures the traceability of steel products (manufacturing history management) by marking steel products with a steel product management code. The steel product management code is associated with a steel piece identification code indicating a steel piece used as a material of a steel product and positional information indicating a position in the steel piece. By doing so, consistent traceability is ensured in the process from casting to manufacturing a steel product.

SUMMARY

In the related art, the manufacturing history of a product is managed by marking a product management code on the surface of the product (see International Patent Publication No. WO2018/117120). As a method of marking a product management code, there are, for example, a method of stamping a product management code on the surface of a product using a pin, a method of engraving a product management code on the surface of a product using a laser, and a method of attaching a bar code on which a product management code is printed on the surface of the product.

However, when a product management code is marked on the surface of the product as described above, the product management code marked on the surface of the product may be lost due to an external factor. To be more specific, the surface of the product may be damaged by an external force applied to the surface of the product during use, or the surface of the product may deteriorate over time and the product management code may become unreadable.

In this way, if the product management code marked on the surface of the product is lost, there is a problem that a manufacturing history of the product cannot be appropriately managed.

In light of the above problem, an object of the present disclosure is to provide a manufacturing history management system and a manufacturing history management method capable of appropriately managing a manufacturing history of a product.

An example aspect of the present disclosure is a manufacturing history management system including: a data generation unit configured to generate manufacturing history data by associating internal void information specific to a product and manufacturing history information of the product with a product identification code, the internal void information being acquired at a first timing after the product is manufactured; a data storage unit configured to store the manufacturing history data relating to a plurality of the products, the manufacturing history data being generated by the data generation unit; and a data extraction unit configured to check the internal void information of the manufacturing history data of the plurality of products stored in the data storage unit with the internal void information of a predetermined product, the internal void information of the predetermined product being acquired at a second timing after the first timing, and extract the manufacturing history data that matches the internal void information of the predetermined product from the manufacturing history data of the plurality of products stored in the data storage unit.

In the manufacturing history management system described above, the internal void information of the manufacturing history data of the plurality of products stored in the data storage unit is checked against the internal void information of the predetermined product, and the manufacturing history data matching the internal void information of the predetermined product is extracted from the manufacturing history data of the plurality of products stored in the data storage unit. That is, in the manufacturing history management system described above, the manufacturing history data of a predetermined product is extracted by using the internal void information of the manufactured product as product-specific information. It is therefore not necessary to mark the product management code on the surface of the product as in the related art, and thus the manufacturing history of the product can be appropriately extracted even if the surface of the product is damaged by an external force. Hence, the manufacturing history of the product can be appropriately managed.

In the above manufacturing history management system, the internal void information may include information relating to a contour of the product, and the internal void information may include positional information of the internal void relative to the contour of the product. By including the information about the contour of the product in the internal void information in this way, the accuracy of extracting the manufacturing history data in the data extraction unit can be improved.

In the above manufacturing history management system, the internal void information may be three-dimensional information of an internal void of the product photographed by an X-ray CT apparatus. By using the three-dimensional information of the internal void of the product as the internal void information, the accuracy of extracting the manufacturing history data in the data extraction unit can be improved.

In the above manufacturing history management system, the internal void information may be two-dimensional information of an internal void of the product photographed by an X-ray apparatus. By using the two-dimensional information of the internal void of the product as the internal void information, the accuracy of extracting the manufacturing history data in the data extraction unit can be improved.

In the above manufacturing history management system, the product may be a cast product, and the internal void information may be information about a blowhole present in the cast product. Thus, the manufacturing history of the cast product can be appropriately managed.

In the above manufacturing history management system, the first timing may be a timing for inspecting the product after the product is manufactured, and the second timing may be a timing for inspecting the product after the product is shipped. Thus, the manufacturing history of the cast product can be appropriately managed.

Another example aspect of the present disclosure is a manufacturing history management method including: generating manufacturing history data by associating internal void information specific to a product and manufacturing history information of the product with a product identification code, the internal void information being acquired at a first timing after the product is manufactured; storing each piece of the manufacturing history data relating to each of a plurality of the products in a data storage unit; and checking the internal void information of the manufacturing history data of the plurality of products stored in the data storage unit with the internal void information of a predetermined product, the internal void information of the predetermined product being acquired at a second timing after the first timing, and extracting the manufacturing history data that matches the internal void information of the predetermined product from the manufacturing history data of the plurality of products stored in the data storage unit.

In the manufacturing history management method described above, the internal void information of the manufacturing history data of the plurality of products stored in the data storage unit is checked against the internal void information of the predetermined product, and the manufacturing history data matching the internal void information of the predetermined product is extracted from the manufacturing history data of the plurality of products stored in the data storage unit. That is, in the manufacturing history management method described above, the manufacturing history data of a predetermined product is extracted by using the internal void information of the manufactured product as product-specific information. It is therefore not necessary to mark the product management code on the surface of the product as in the related art, and thus the manufacturing history of the product can be appropriately extracted even if the surface of the product is damaged by an external force. Hence, the manufacturing history of the product can be appropriately managed.

According to the present disclosure, it is possible to provide a manufacturing history management system and a manufacturing history management method capable of appropriately managing a manufacturing history of a product.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 is a table showing an example of manufacturing history data; and

DESCRIPTION OF EMBODIMENTS

Embodiments of the present disclosure will now be described with reference to the drawings.

Figure 1:
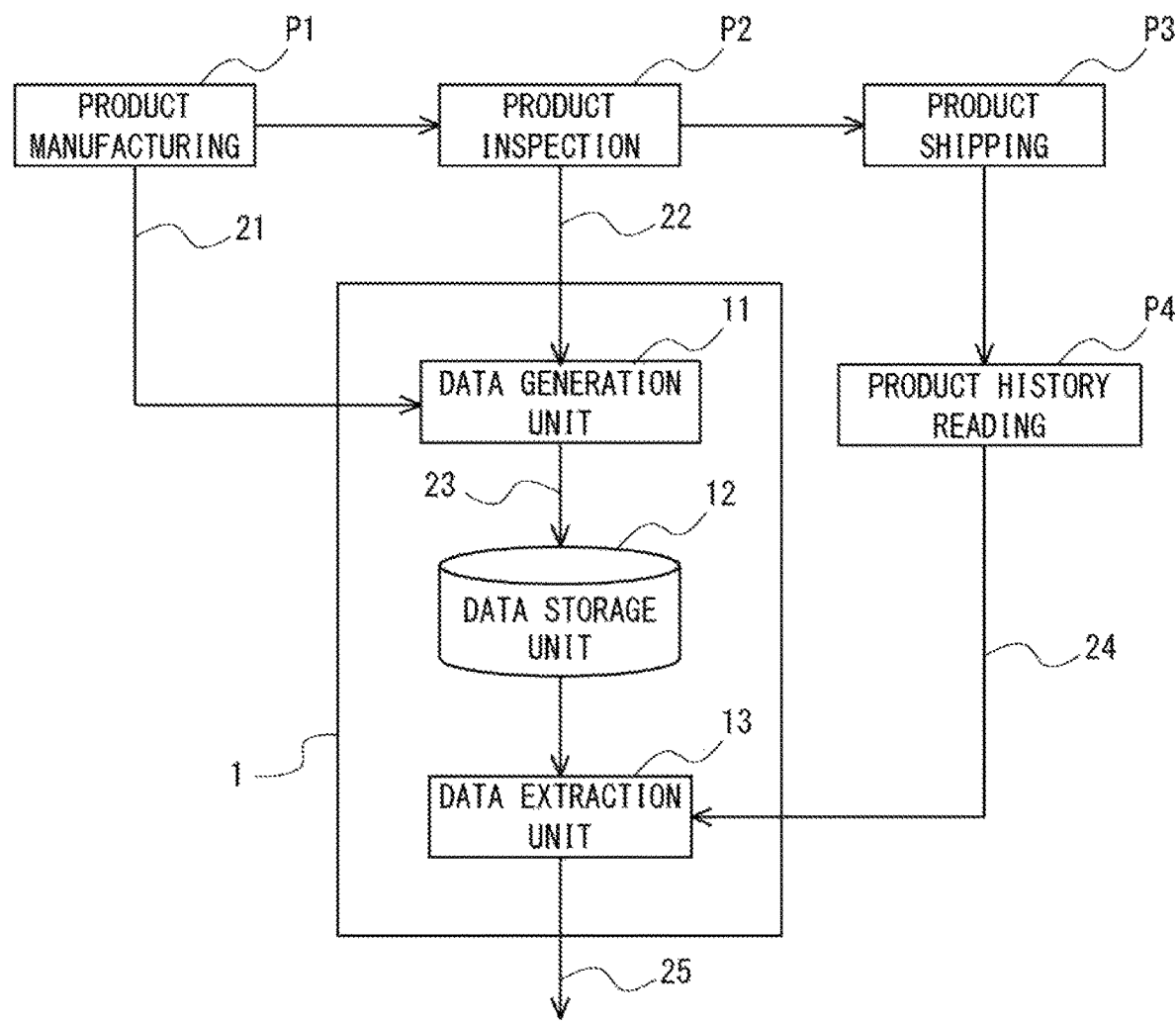
FIG. 1 is a block diagram for explaining a manufacturing history management system according to an embodiment of the present disclosure.

FIG. 1 is a block diagram for explaining a manufacturing history management system according to an embodiment. A manufacturing history management system 1 according to this embodiment can be used in a series of steps of a product including a product manufacturing step P1, a product inspection step P2, a product shipping step P3 for shipping a product including an internal void and found to have no problem in the product function by the inspection of the product inspection step P2, and a manufacturing history reading step P4. In other words, the manufacturing history management system 1 according to this embodiment can be used for manufacturing history management in a series of steps of a product including manufacturing, shipping (P1 to P3) of the product, and quality check (manufacturing history reading: P4) of the product after shipping.

The manufacturing history management system 1 according to this embodiment can be applied to products manufactured by various manufacturing methods such as products manufactured by casting, products manufactured by injection molding, and so on. Hereinafter, although the present disclosure is applied to a cast product as an example, the present disclosure can be widely applied to a product other than a cast product.

As shown in FIG. 1, the manufacturing history management system 1 according to this embodiment is a manufacturing history management system for managing the manufacturing history of a product. The manufacturing history management system 1 includes a data generation unit 11, a data storage unit 12, and a data extraction unit 13.

The data generation unit 11 generates manufacturing history data by associating internal void information 22 of a product and manufacturing history information 21 of the product with a product identification code (data generation step). The manufacturing history information 21 of the product is manufacturing history information in the product manufacturing step P1, and is, for example, information relating to manufacturing conditions in manufacturing the product. For example, in the case of a cast product, the product manufacturing step P1 includes a melting step, a casting step, and a finishing step, and the manufacturing history information 21 is information relating to manufacturing conditions in these steps. As an example, the manufacturing history information 21 includes a molten metal temperature, a casting temperature, a casting time, a cooling temperature, a cooling time, and so on.

The manufacturing history information 21 may include information after the product inspection step P2. The manufacturing history information 21 may include, for example, the manufacturing history information of the product in each of the processing step, the assembling step, and the product shipping step P3 after the product inspection step P2.

The internal void information 22 of the product is acquired in the product inspection step P2 and is information relating to an internal void of the product manufactured in the product manufacturing step P1. For example, when the product is a cast product, the internal void information 22 is information about blowholes that are present in the cast product. The information about the blowholes is, for example, information about the position of the blowholes, the size of the blowholes, the shape of the blowholes, the number of the blowholes, the density of the blowholes, etc.

The internal void information 22 may include information related to the contour of the product. In this case, the internal void information 22 includes positional information (coordinate information) of the internal void on the contour of the product. Note that products manufactured in the manufacturing step P1 of the product are assumed to be the products having the same shape, specifically, products manufactured by using molds having the same shape, and are products having the same shape as the product.

For example, the internal void information 22 is three-dimensional information of an internal void of a product photographed by an X-ray CT (Computed Tomography) apparatus. The internal void information 22 may be two-dimensional information about the internal void of the product photographed by the X-ray apparatus.

Figure 2:
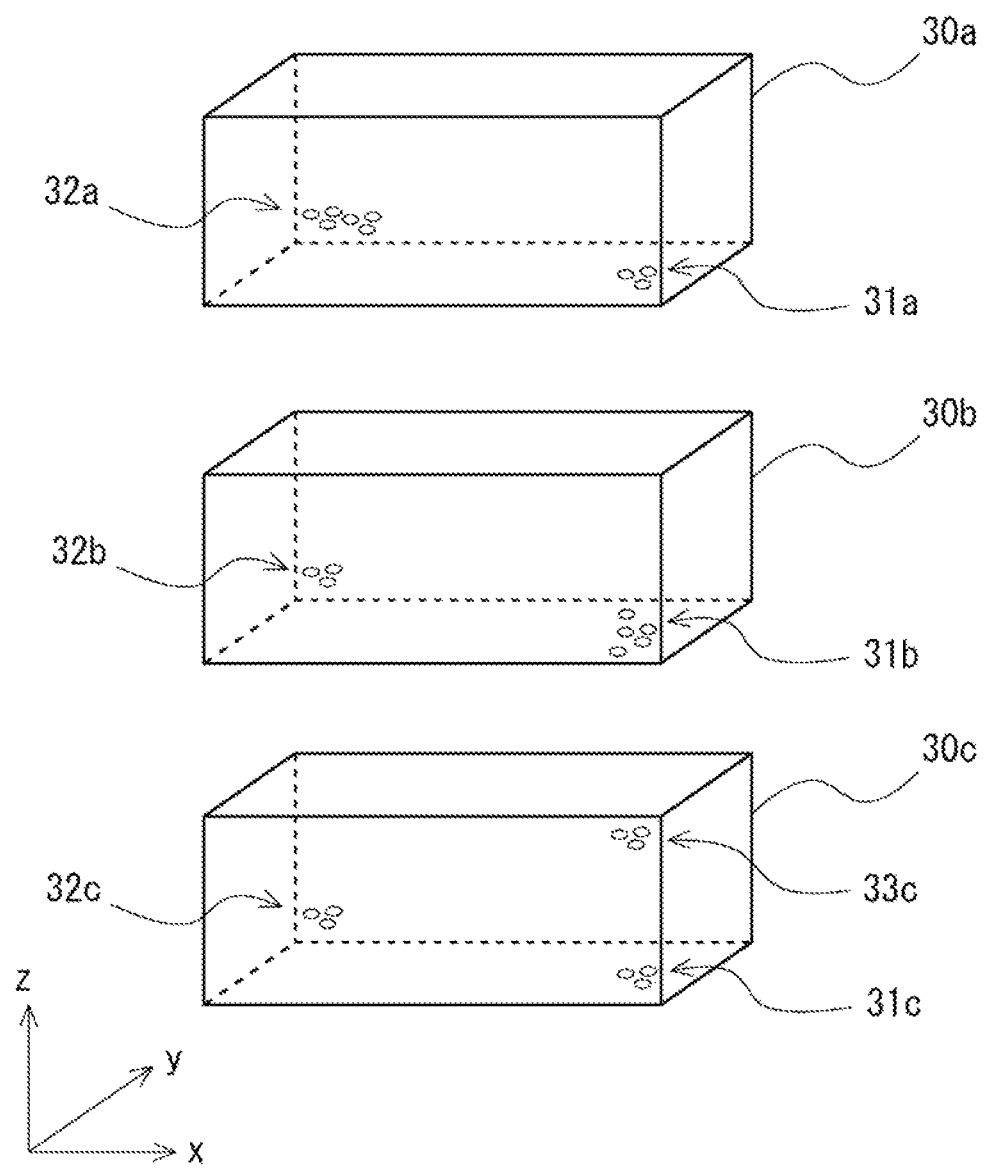
FIG. 2 is a diagram for explaining internal void information of the product.

FIG. 2 is a diagram for explaining the internal void information of the product. FIG. 2 schematically shows the internal void information acquired when products 30a to 30c are photographed by an X-ray CT apparatus. As shown in FIG. 2, the positions and number of internal voids included in each of the products 30a to 30c vary depending on the product, and the internal void information of the products 30a to 30c can be used as product-specific information. Although FIG. 2 shows an example in which the number and position of the internal voids of the respective products are different in order to simplify the description, the shapes, sizes, etc. of the internal voids of the respective products are also different in actual products.

For example, in the product 30a, internal voids 31a are present on the positive side in the x-axis direction, and internal voids 32a are present on the negative side in the x-axis direction. Likewise, in the product 30b, internal voids 31b are present on the positive side in the x-axis direction, and internal voids 32b are present on the negative side in the x-axis direction. Comparing the product 30a with the product 30b, the positions where the internal voids are present are similar, but the numbers of internal voids are different. Specifically, the number of the internal voids 30a on the positive side in the x-axis direction of the product 31a is smaller than the number of the internal voids 30b on the positive side in the x-axis direction of the product 31b. On the other hand, the number of internal voids 30a on the negative side in the x-axis direction of the product 32a is larger than the number of internal voids 30b on the negative side in the x-axis direction of the product 32b. As described above, since the number of internal voids of the product 30a differs from that of the product 30b, the internal void information of these products can be used as the product-specific information.

Likewise, in the product 30c, internal voids 31c are present on the positive side in the x-axis direction, and internal voids 32c are present on the negative side in the x-axis direction. Further, in the product 30c, internal voids 33c are present on the positive side in the z-axis direction. That is, comparing the product 30a with the product 30b, the product 30c has the internal voids 33c on the positive side in the z-axis direction. As described above, since the positions where the internal voids are present in the products 30a and 30b differ from the positions where the internal voids are present in the product 30c, the internal voids of these products can be used as the product-specific information.

Although FIG. 2 shows an example in which the numbers and positions of internal voids are different between the products, in this embodiment, internal void information (shapes, sizes, etc. of the internal voids) other than these items may be used as the product-specific information.

For example, the internal void information can be acquired by executing predetermined software in an arithmetic device such as a computer. Specifically, by processing transmission image data acquired by an X-ray CT apparatus using predetermined software, the internal void information can be automatically acquired.

More specifically, the internal void information can be acquired by non-destructively acquiring the transmission image data of the product using the X-ray CT apparatus, and performing predetermined processing on the acquired transmission image data. For example, binarization processing is performed on the acquired transmission image data of the product. A polygon model (3D model) is created by using a method such as a marching cubes method on the binarized image data. After that, the internal void information (positions, sizes, shapes, number, densities, etc. of the internal voids) is acquired using the acquired three-dimensional model. When the internal void is identified from the three-dimensional model, for example, image processing software for identifying the internal void may be used. The internal void information may include information relating to the contour of the product, and in this case, positional information (coordinate information) of the internal void relative to the contour of the product is acquired.

In the above description, the case in which the three-dimensional information of the internal void is acquired by using the X-ray CT apparatus is described. However, the same method as the one described above may also be used for the case in which the two-dimensional information of the internal void is acquired by using the X-ray apparatus.

As described above, the data generation unit 11 generates the manufacturing history data by associating the internal void information 22 of the product and the manufacturing history information 21 of the product with the product identification code. FIG. 3 is a table showing an example of the manufacturing history data. As shown in FIG. 3, the manufacturing history data 23 is generated by the data generation unit 11 for each product. The manufacturing history data 23 relating to a plurality of products generated by the data generation unit 11 is stored in the data storage unit 12.

As shown in the table of FIG. 3, the manufacturing history data 23 includes the internal void information of the product, the product identification code, and the manufacturing history information, which are stored in association with each other. For example, the manufacturing history data of a product A is generated in the following manner.

First, the product A is manufactured in the product manufacturing step P1 of FIG. 1. The manufacturing conditions A1, A2, . . . at this time are supplied to the data generation unit 11 as the manufacturing history information 21. After that, the product A is inspected in the product inspection step P2. Specifically, the internal void information of the product is acquired by using the X-ray CT apparatus or the like. The acquired internal void information 22 of the product is supplied to the data generation unit 11.

The data generation unit 11 generates the manufacturing history data of the product A by associating the manufacturing history information 21 of the product A and the internal void information 22 of the product A with the product identification code of the product A ("0001" in the example shown in FIG. 3). The product identification code is a character string which can be freely determined. The product identification code may be, for example, a serial number, a lot number of a product, or a file name of image data when the product is inspected by using the X-ray CT apparatus or the like. The data generation unit 11 may generate the manufacturing history data including the manufacturing history information of the step after the product inspection step P2.

In a manner similar to the product A, the data generation unit 11 can generate the manufacturing history data for other products B, C, . . . by associating the internal void information 22 of each product and the manufacturing history information 21 of the corresponding product with the product identification code of the corresponding product.

Although the table shown in FIG. 3 schematically shows the internal void information, the internal void information actually stored in the data storage unit 12 is three-dimensional image data or two-dimensional image data in which the internal void is identified, and for example, such data is stored in the data storage unit 12 as image data.

The data generation unit 11 stores the manufacturing history data 23 of each product generated as described above in the data storage unit 12 (data storage step). Thus, the manufacturing history data 23 of the respective products is accumulated in the data storage unit 12.

The data extraction unit 13 shown in FIG. 1 checks the internal void information of the manufacturing history data of the plurality of products stored in the data storage unit 12 against the internal void information 24 of a predetermined product acquired at a predetermined timing, and extracts the manufacturing history data 25 matching the internal void information of the predetermined product from the manufacturing history data 23 of the plurality of products stored in the data storage unit 12 (data extraction step).

The predetermined timing corresponds to the manufacturing history reading step P4 shown in FIG. 1. For example, the predetermined timing is when the manufacturing history is read to check the quality of the product after the product is shipped. The predetermined timing is not limited in particular and may be any timing as long as it is after the data generation unit 11 stores the manufacturing history data 23 in the data storage unit 12.

When the manufacturing history of a predetermined product is extracted after the product is shipped, the internal void information of the predetermined product is acquired (manufacturing history reading step P4). The internal void information of a predetermined product can be acquired using a method similar to the method of acquiring the internal void information 22 of the product in the product inspection step P2. That is, the internal void information of a predetermined product can be acquired by using an X-ray CT apparatus (three-dimensional information) or an X-ray apparatus (two-dimensional information).

Figure 4:
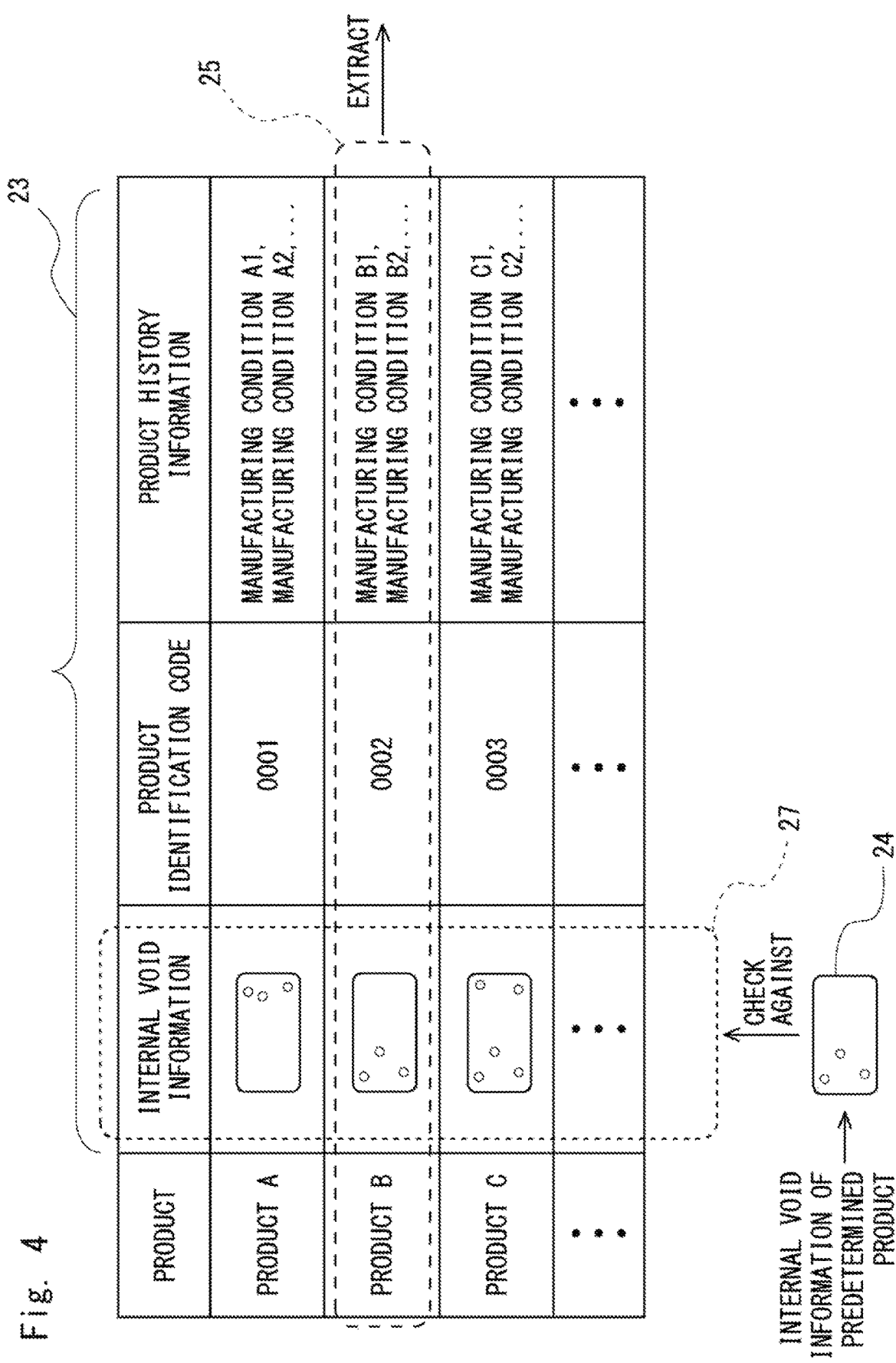
FIG. 4 is a diagram for explaining an operation of a data extraction unit.

FIG. 4 is a diagram for explaining the operation of the data extraction unit 13. The data storage unit 12 shown in FIG. 1 stores the manufacturing history data 23 of each product as shown in FIG. 4. The data extraction unit 13 checks the internal void information 27 of the manufacturing history data 23 of a plurality of products stored in the data storage unit 12 against the internal void information 24 (internal void information 24 acquired in the manufacturing history reading step P4) of a predetermined product. When the internal void information 27 of the manufacturing history data contains the internal void information that matches the internal void information 24 of the predetermined product, this matching manufacturing history data 25 of the internal void information is extracted. FIG. 4 shows an example in which the manufacturing history data 25 of the product B is extracted.

As described above, the data extraction unit 13 checks the internal void information 27 of the manufacturing history data 23 of a plurality of products stored in the data storage unit 12 against the internal void information 24 of a predetermined product. Thus, it is necessary that the internal void information 24 acquired in the manufacturing history reading step P4 correspond to the internal void information 22 (namely, the internal void information 22 acquired in the product inspection step P2) used in generating the manufacturing history data in the data generation unit 11.

That is, when the internal void information 22 acquired in the product inspection step P2 is three-dimensional image data, the internal void information 24 acquired in the manufacturing history reading step P4 must also be three-dimensional image data. Likewise, when the internal void information 22 obtained in the product inspection step P2 is two-dimensional image data, the internal void information 24 obtained in the manufacturing history reading step P4 must also be two-dimensional image data.

For example, when the data extraction unit 13 checks the internal void information 27 of the manufacturing history data 23 stored in the data storage unit 12 against the internal void information 24 of a predetermined product, the data extraction unit can compare the position, size, and shape of the internal void included in the internal void information 27 with the position, size, and shape of the internal void included in the internal void information 24, respectively, to determine whether the internal void information 27 matches or differs from the internal void information 24. Such processing can be performed by executing predetermined software (matching software) in an arithmetic unit such as a computer.

In this embodiment, the internal void information 22 acquired in the product inspection step P2 is checked against the internal void information 24 acquired in the manufacturing history reading step P4. Thus, to acquire the internal void information 24 in the manufacturing history reading step P4, it is preferable to use the same X-ray CT apparatus, image processing software, and imaging conditions as those used to acquire the internal void information 22 in the product inspection step P2. That is, when X-ray CT apparatus and image processing software used to acquire the internal void information 22 are the same as those used to acquire the internal void information 24, it is possible to effectively reduce the variations of the internal void information caused by using different equipment manufacturers and the variations of the internal void information caused by using different the image processing software.

As described above, in the manufacturing history management system 1 according to this embodiment, the internal void information 27 of the manufacturing history data 23 of a plurality of products stored in the data storage unit 12 is checked against the internal void information 24 of a predetermined product to extract the manufacturing history data 25 matching the internal void information 24 of the predetermined product from the manufacturing history data 23 of a plurality of products stored in the data storage unit 12 (see FIGS. 1 and 4). That is, in the manufacturing history management system 1 according to this embodiment, the manufacturing history data of a predetermined product is extracted by using the internal void information of the manufactured product as the product-specific information. It is thus not necessary to mark the product management code on the surface of a product as in the related art, thereby enabling the manufacturing history of the product to be appropriately extracted even if the surface of the product is damaged by an external force.

According to the present disclosure, it is possible to provide a manufacturing history management system and a manufacturing history management method capable of appropriately managing the manufacturing history of a product.

For example, the manufacturing history management system 1 according to this embodiment may be configured as a local system in a factory. In this case, the manufacturing history management system 1 may be implemented as part of the system for managing the factory.

The manufacturing history management system 1 according to this embodiment may be configured as a cloud system. In this case, the manufacturing history of products produced in a plurality of factories may be collectively managed. Further, the information of the production plant may be included in the manufacturing history information of the product.

The manufacturing history management system 1 according to this embodiment may be used in combination with a technique (related art) for marking a product management code on the surface of a product. Specifically, the product management code may be marked on the surface of the product, and the manufacturing history of the product may be managed using the manufacturing history management system 1 according to this embodiment. For example, the manufacturing history of a product is usually managed using a product management code marked on the surface of the product, and when the product management code marked on the surface of the product is lost, the manufacturing history of the product may be managed using the manufacturing history management system 1 according to this embodiment.

That is, when the product management code marked on the surface of the product is lost due to an external factor, the manufacturing history of the product may be managed using the manufacturing history management system 1 according to this embodiment as a backup.

The manufacturing history management system 1 according to this embodiment may manage a plurality of kinds of products collectively. For example, a plurality of kinds of products manufactured on a plurality of production lines may be collectively managed by one manufacturing history management system 1.

Although the manufacturing history management system 1 according to this embodiment has been described above, the manufacturing history management method according to this embodiment can be implemented in a manner similar to the manufacturing history management system 1 according to this embodiment. In this case, each of the data generation unit 11, the data storage unit 12, and the data extraction unit 13 included in the manufacturing history management system 1 according to this embodiment performs the data generation step, the data storage step, and the data extraction step of the manufacturing history management method according to this embodiment, respectively.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A manufacturing history management system comprising:
    a data generation unit configured to generate manufacturing history data by associating internal void information specific to a product and manufacturing history information of the product with a product identification code, the internal void information specific to the product being positional information of the internal void relative to a contour of the product and being acquired at a first timing after the product is manufactured;
    a data storage unit configured to store the manufacturing history data relating to a plurality of the products, the manufacturing history data being generated by the data generation unit; and
    a data extraction unit configured to check the internal void information of the manufacturing history data of a plurality of products stored in the data storage unit with the internal void information of a predetermined product, the internal void information of the predetermined product being acquired at a second timing after the first timing, and extract the manufacturing history data that matches the internal void information of the predetermined product from the manufacturing history data of the plurality of products stored in the data storage unit.

2. The manufacturing history management system according to claim 1, wherein
    the internal void information includes information relating to the contour of the product.

3. The manufacturing history management system according to claim 1, wherein
    the internal void information is three-dimensional information of an internal void of the product photographed by an X-ray CT apparatus.

4. The manufacturing history management system according to claim 1, wherein
    the internal void information is two-dimensional information of an internal void of the product photographed by an X-ray apparatus.

5. The manufacturing history management system according to claim 1, wherein
    the product is a cast product, and the internal void information is information about a blowhole present in the cast product.

6. The manufacturing history management system according to claim 1, wherein
    the first timing is a timing for inspecting the product after the product is manufactured, and
    the second timing is a timing for inspecting the product after the product is shipped.

7. A manufacturing history management method, the method being executed by at least one processor, and the method comprising:
    generating manufacturing history data by associating internal void information specific to a product and manufacturing history information of the product with a product identification code, the internal void information specific to the product being positional information of the internal void relative to a contour of the product and being acquired at a first timing after the product is manufactured;
    storing each piece of the manufacturing history data relating to each of a plurality of the products in a data storage unit; and
    checking the internal void information of the manufacturing history data of a plurality of products stored in the data storage unit with the internal void information of a predetermined product, the internal void information of the predetermined product being acquired at a second timing after the first timing, and extracting the manufacturing history data that matches the internal void information of the predetermined product from the manufacturing history data of the plurality of products stored in the data storage unit.

* * * * *